United States Patent [19]  [11] 4,420,195
Christen  [45] Dec. 13, 1983

[54] BALL BEARING RETAINER

[75] Inventor: Eugene W. Christen, Birmingham, Mich.

[73] Assignee: General Motors Corporation, Detroit, Mich.

[21] Appl. No.: 303,358

[22] Filed: Sep. 18, 1981

[51] Int. Cl.³ ............................................ F16C 33/38
[52] U.S. Cl. .................................................. 308/201
[58] Field of Search .................. 308/201, 189 R, 217, 308/235, 188, 218

[56] References Cited

U.S. PATENT DOCUMENTS

| | | | |
|---|---|---|---|
| 3,582,165 | 6/1971 | Koch | 308/217 |
| 3,749,461 | 7/1973 | Liss et al. | 308/201 |
| 4,136,915 | 1/1979 | Derner | 308/201 |
| 4,278,307 | 7/1981 | Olschewski et al. | 308/201 |
| 4,324,444 | 4/1982 | Buczynski et al. | 308/201 |

FOREIGN PATENT DOCUMENTS 1400987 6/1973 Fed. Rep. of Germany .
1370890 10/1974 United Kingdom .
1410414 10/1975 United Kingdom .

Primary Examiner—Stuart S. Levy
Assistant Examiner—David J. Werner
Attorney, Agent, or Firm—Patrick M. Griffin

[57] ABSTRACT

A ball bearing cage for retaining and separating bearing balls includes a series of circumferentially spaced, spherical ball retention pockets terminating in opposed flexible retention lips located in a common radial plane of the body portion of the cage. The cage includes a ball separation and guidance projection between each ball retention pocket. The projection includes a pair of sloped walls extending from an apex axially beyond the plane of the retention lips and integral with a retention lip. Each projection further includes a radial opening intermediate the sloped walls and the body of the cage. During bearing assembly, a complement of bearing balls are separated and guided by the sloped walls toward respective retention pockets, the sloped walls and projections flexing toward one another about the apex as the retention lips of adjacent ball pockets are flexed apart by the bearing balls snap fitting within the pockets.

1 Claim, 3 Drawing Figures

BALL BEARING RETAINER

BACKGROUND OF THE INVENTION

Radial ball bearings of the type having an inner and outer race with a plurality of bearing balls in rolling engagement therebetween must include a retainer or cage for the balls if less than a full complement of bearing balls is used. While such cages used to be made of metal, it is now preferable to mold such cages as a one piece unit from a plastic material. Such retainers or cages generally include an annular body portion with a plurality of axially opening, spherically concave retention pockets circumferentially spaced therearound, with each retention pocket having a pair of flexible retention lips which flex apart as a ball is inserted therein and flex back to retain the ball. The annular body portion includes an equal number of axially opening gaps between the adjacent ball pockets. During normal Conrad type assembly of the ball bearing, it is desirable to block the bearing balls out of these gaps and also, if possible, to provide side to side separation to guide the bearing balls toward a retention pocket. It is also necessary that the flexibility of the retention lips not be affected.

Ball bearing retainers and cages in the prior art generally include a structure located in the gap between adjacent ball pockets which is either completely separate from the adjacent retention lips or which contains a discontinuity therein, so as to block bearing balls from the gap and provide side to side separation without interfering with the flexibility of the retention lips of the adjacent ball retention pockets. The British patent specification to Bishop et al No. 1,370,890 shows a separate, axially extending projection included in the gap between the retention lips of adjacent ball pockets which blocks bearing balls from the gap during assembly, and, in some embodiments, the projection extends axially beyond the retention lips to provide some side to side guidance of the bearing balls. Since the projection is physically separate from the retention lips, it does not interfere with the flexibility thereof. Similarly, Liss et al U.S. Pat. No. 3,749,461 discloses an axially extending projection in the gap between the retention lips of adjacent ball pockets which extends axially beyond the retention lips and has a conical end to both block balls and provide side to side guidance.

German Pat. No. 1,400,987 to Menninger et al shows a plastic cage with a pair of sloped projections in each gap, one sloping toward a retention lip of each of the adjacent ball pockets. There is a central slot between the projections so that they may flex toward one another with the retention lips. Olschewski et al U.S. Pat. No. 4,278,307 discloses projections in the gaps between the retention lips of adjacent ball pockets, both of the single projection variety and the double projection type, with a deep slit therebetween, and in addition, the projections include deformable axial ends which allow them to be bent over after assembly of the balls to help the retention lips from flexing back to prevent escape of a bearing ball from a ball retention pocket.

SUMMARY OF THE INVENTION

The subject invention provides a ball bearing retainer having a single, continuous projection which covers the gap between each pair of adjacent ball pockets which is integral with a retention lip of each adjacent ball pocket. The projection provides blockage and separating guidance to the bearing ball during assembly, and flexes with the retention lips so as not to interfere with the assembly of the balls within the pockets.

In a preferred embodiment, a molded, one piece plastic retainer includes a body portion having a plurality of evenly circumferentially spaced partially spherical ball retention pockets, each of which includes a pair of converging, flexible retention lips which terminate in a common radial plane of the body portion. The gap between each pair of adjacent ball pockets is spanned by a projection which includes a pair of integral sloped walls which extend axially outwardly from a respective ball retention lip of adjacent ball pockets to an apex located axially outwardly of the plane of the ball retention lips. Each projection therefore provides a continuous guidance surface sloping toward an adjacent ball pocket. The radial opening between each projection and the body portion allows the sloped walls of the projection to flex axially of the body portion and circumferentially toward one another about the apex as bearing balls snap into the respective adjacent ball retention pockets.

It is, therefore, an object of the subject invention to provide a ball bearing retainer with a ball separation and guidance projection between each pair of adjacent ball retention pockets which provides separation of bearing balls during bearing assembly and provides a continuous guidance path toward each adjacent ball pocket. It is a further object of the invention to provide such a projection which includes a continuous, unbroken guidance surface toward each adjacent ball pocket and which is flexible with the retention lips of the adjacent ball pockets so as not to interfere with the assembly of bearing balls into the pockets.

DESCRIPTION OF THE PREFERRED EMBODIMENT

These and other objects of the invention will be apparent from the following written description and drawings in which.

Figure 1:
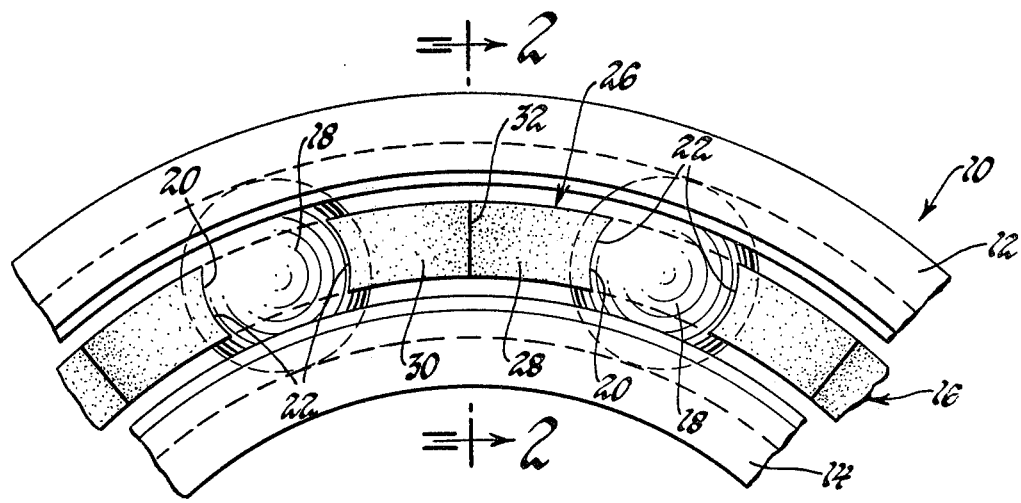
FIG. 1 is a view of a portion of a radial ball bearing having a ball bearing retainer according to this invention and showing a pair of adjacent ball retention pockets and the projection therebetween.
Figure 2:
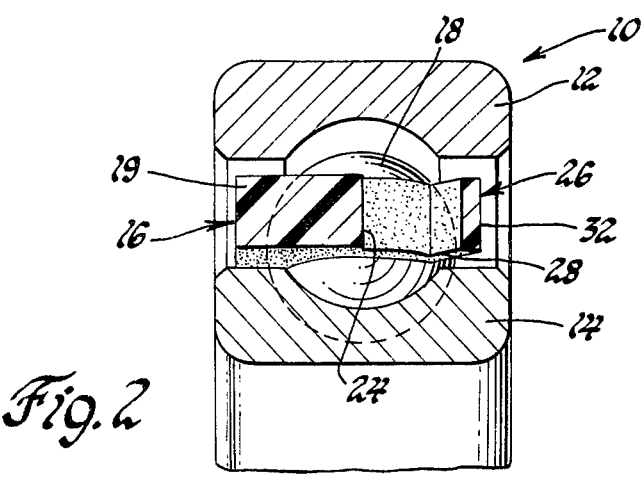
FIG. 2 is a sectional view taken along line 2—2 of FIG. 1.

Referring first to FIG. 1, a radial ball bearing of conventional construction designated generally 10 includes an outer race 12, an inner race 14 and a ball bearing retainer designated generally 16 which retains a less than full complement of bearing balls 18.

Figure 3:
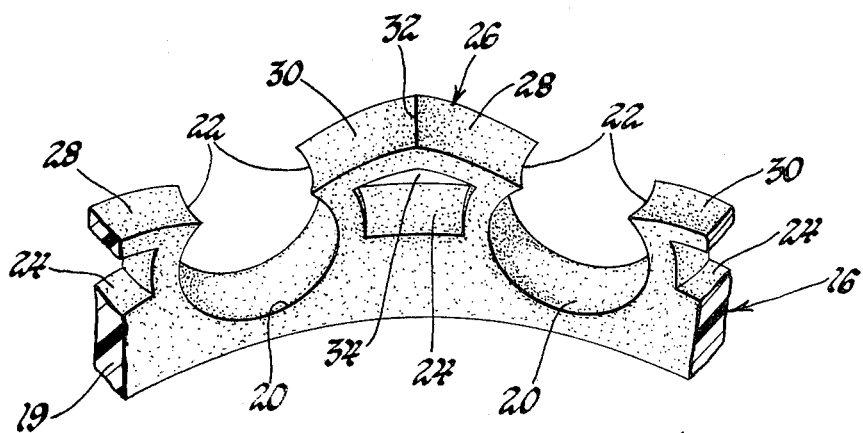
FIG. 3 is a perspective view of a portion of the ball bearing retainer showing a pair of adjacent ball pockets and the projection therebetween.

Referring now to FIG. 3, ball bearing retainer 16 includes a generally annular body portion 19 and a series of ball retention pockets 20 evenly circumferentially spaced therearound and which open axially outwardly of body portion 19. Each ball retention pocket 20 is spherically concave and includes a pair of converging retention lips 22. Retention lips 22 all terminate in a common axial plane of body portion 19 and are flexible axially and circumferentially of the body portion 19 to allow bearing balls 18 to snap fit within them during conventional Conrad type assembly of radial ball bearing 10. The gap, designated generally 24, between the adjacent retention lips 22 of each pair of adjacent ball pockets 20 is covered or spanned by a ball separation and guidance projection designated generally 26 to exclude bearing balls 18 from the gaps during such assembly and provide separation of and guidance of bearing balls 18 toward adjacent ball retention pockets 20 without interfering with the necessary flexing of retention lips 22.

Projection 26 includes a pair of identical sloped walls designated generally 28 and 30 which extend from an apex 32 located axially outwardly of the radial plane of retention lips 22 toward the radial edge portion of the retention lips 22 of adjacent ball pockets 20 and are integral therewith. Walls 28 and 30 each provide a continuous guidance surface or path from apex 32 to a respective adjacent retention lip 22. Thus, bearing balls 18, which come into contact with wall 28 and 30 during conventional Conrad type of assembly will be easily guided toward a respective adjacent ball pocket 20. In addition, the radial opening 34 between body portion 19 and each pair of sloped walls 28 or 30 allows walls 28 and 30 to flex toward one another and axially of body portion 19 about apex 32 as bearing balls 18 move into ball pockets 20. The walls 28 and 30 are thinner than lips 22 so as to readily flex with the lips during ball assembly.

Thus, the invention provides an improved ball bearing retainer.

The embodiments of the invention in which an exclusive property or privilege is claimed are defined as follows:

1. A ball bearing retainer for the retention and guiding separation of bearing balls during bearing assembly, comprising, an annular body portion having a plurality of spherically concave ball retention pockets, each retention pocket opening axially outwardly of the body portion and including a pair of flexible retention lips, the retention lips disposed in a common radial plane of the body portion, each of said lips having a radially extending edge portion a ball separation and guidance projection spanning each pair of adjacent retention pockets to leave a closed radial opening therebetween, said radial opening being located between said projection and said body portion, each projection including a pair of sloped walls, each sloping from an integral apex located axially outwardly of the plane of the retention lips to the said radial edge portion of a respective retention lip of an adjacent ball pocket and being integral therewith, the walls providing separation and guidance of the bearing balls toward the retention pockets during bearing assembly, the radial opening between the body portion and each projection allowing the sloped walls to flex axially of the body portion with the retention lips about the apex as the bearing balls enter the ball retention pockets.

* * * * *